Patented Oct. 2, 1945

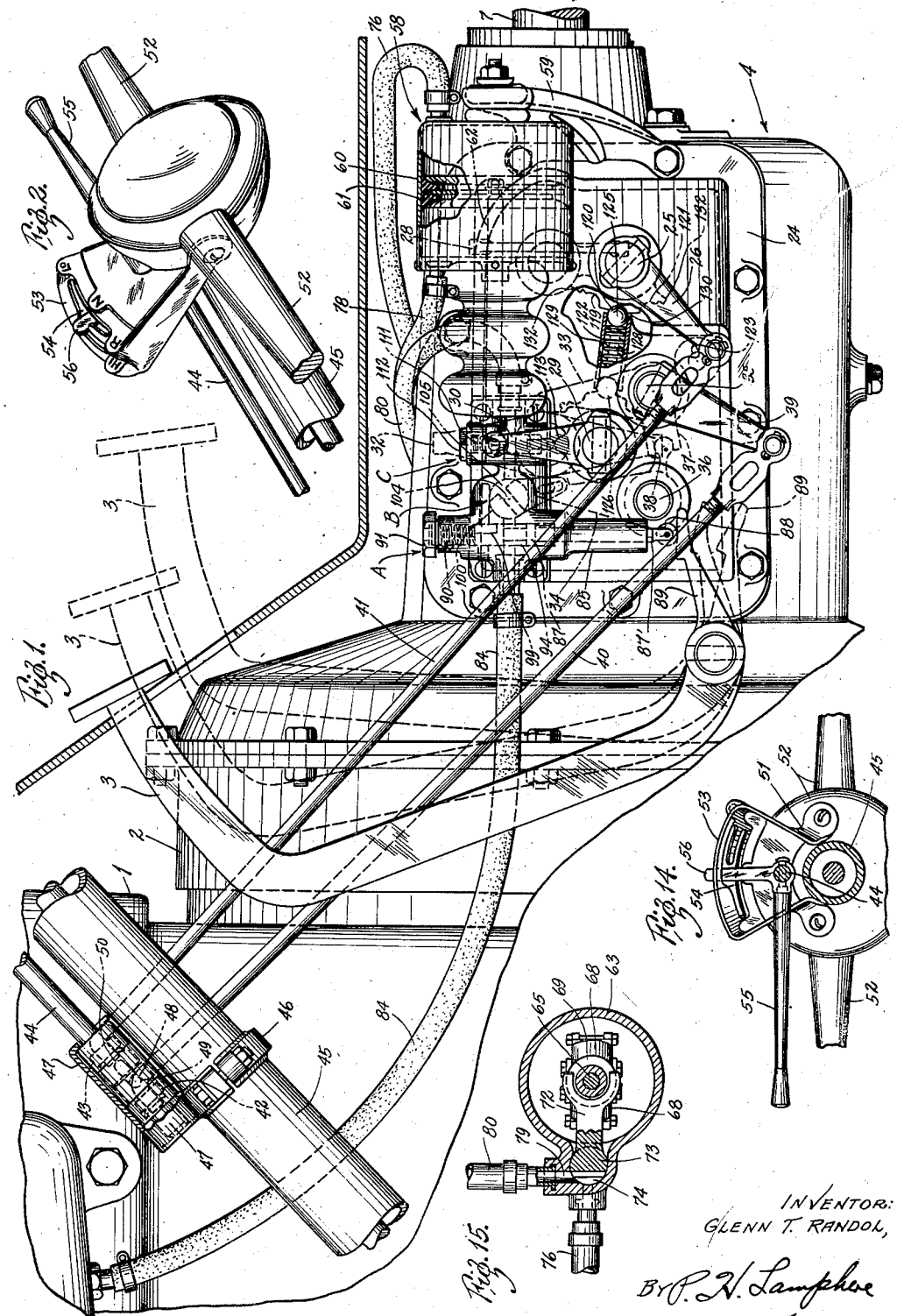

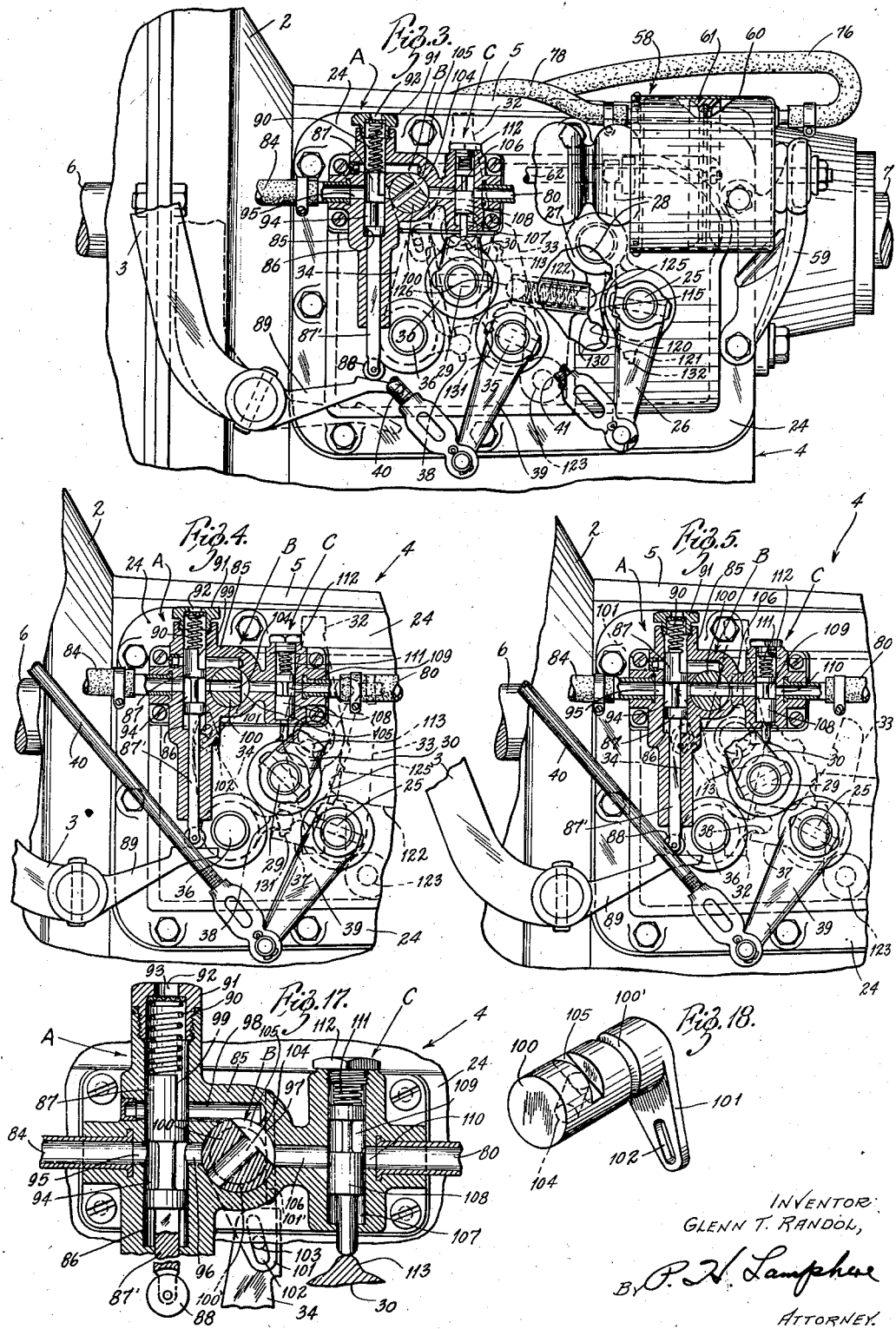

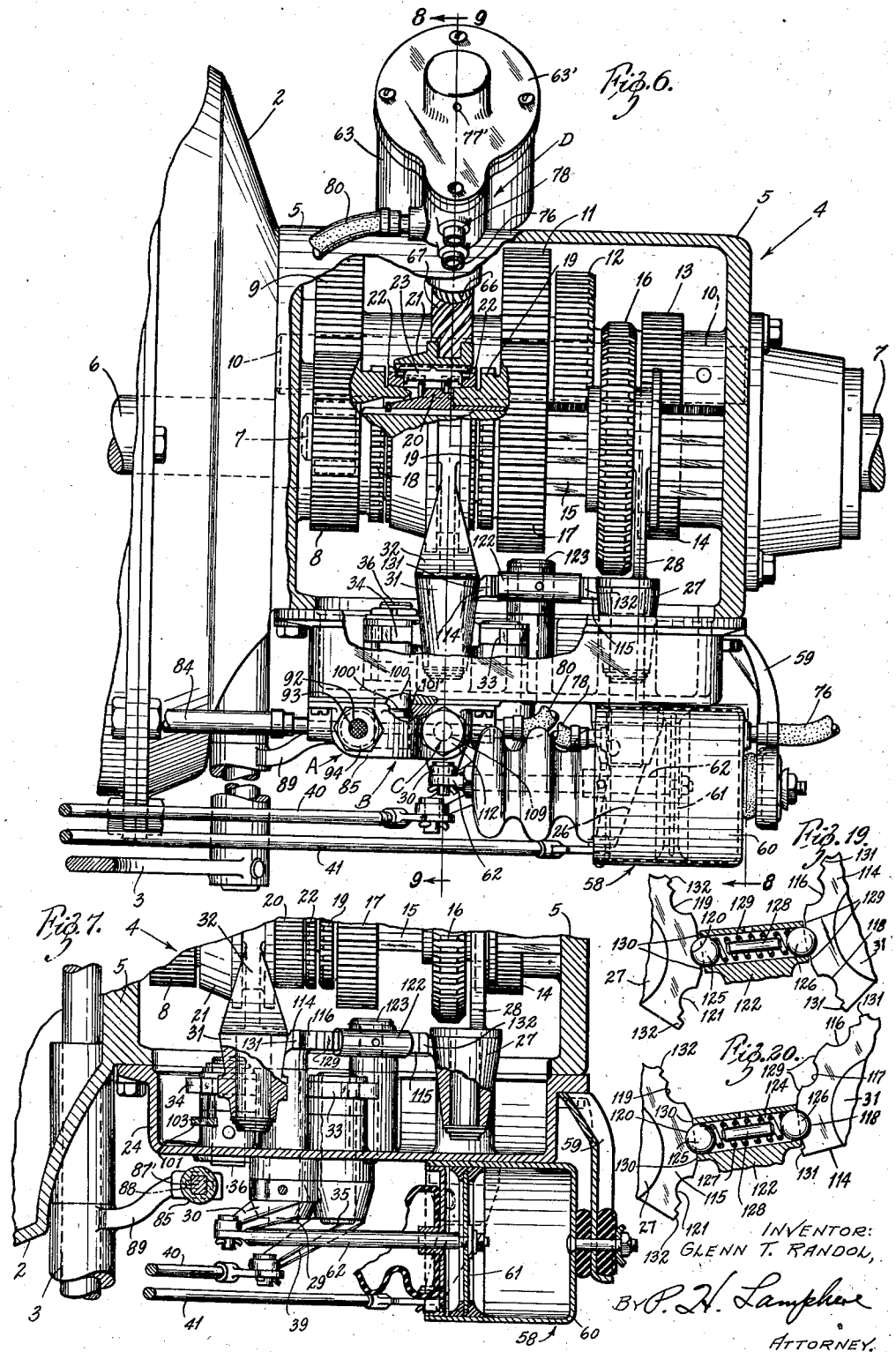

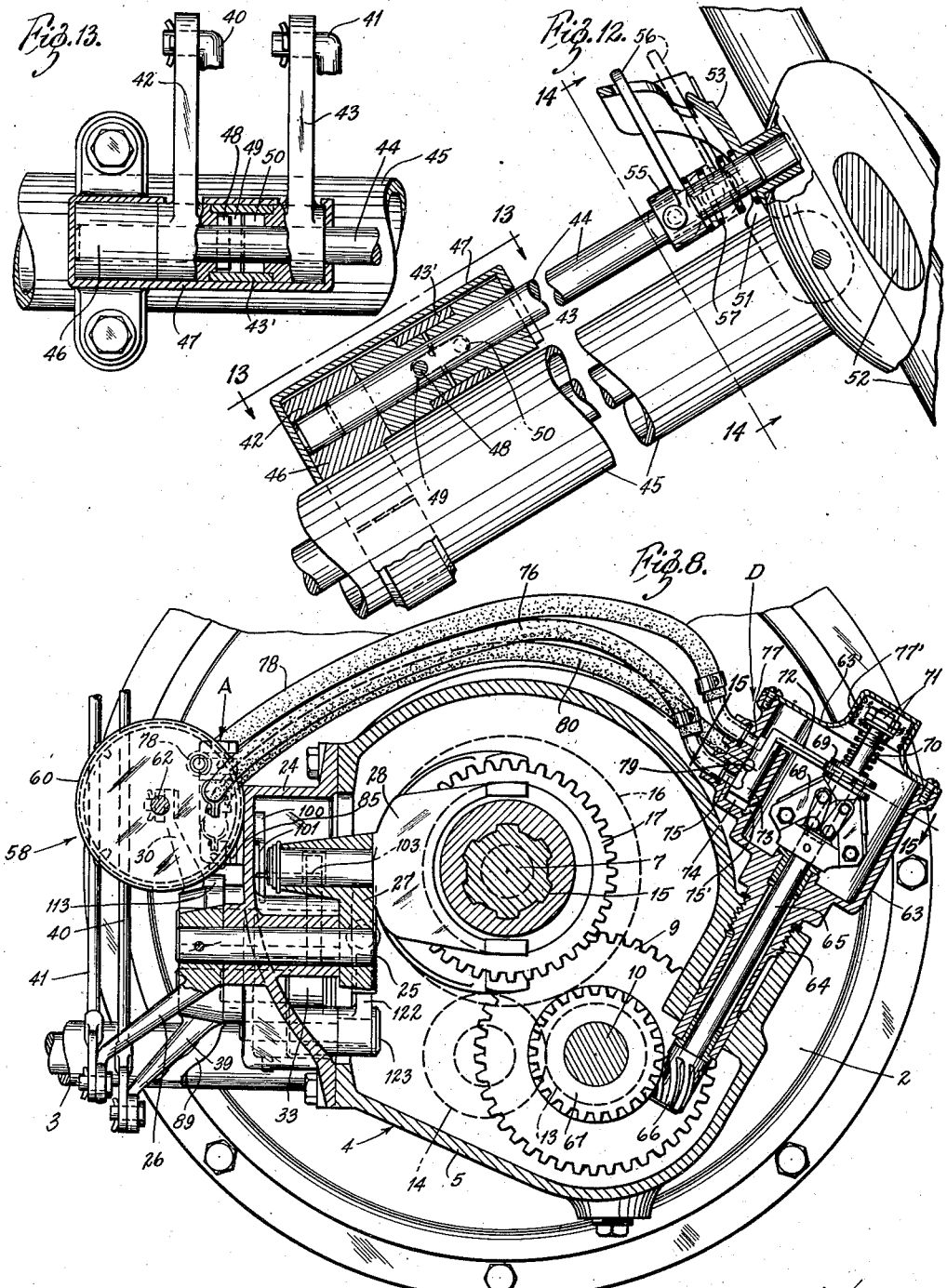

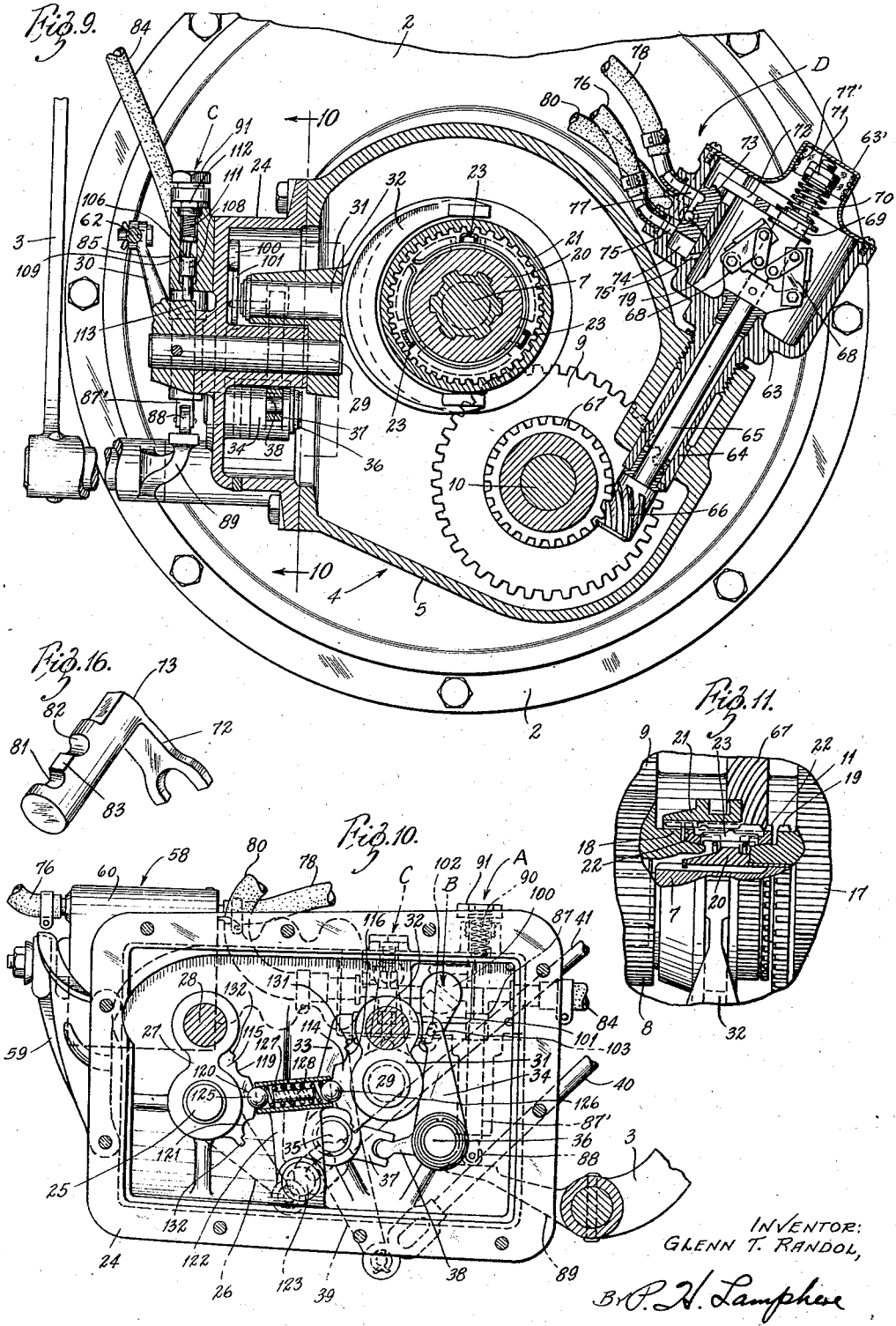

2,386,174

UNITED STATES PATENT OFFICE 2,386,174

CHANGE-SPEED TRANSMISSION CONTROL MEANS

Glenn T. Randol, St. Louis, Mo.

Continuation of application Serial No. 372,048, December 28, 1940. This application January 15, 1944, Serial No. 518,327

36 Claims. (Cl. 192—3.5)

This is a continuation of my application for Change speed transmission control means, Serial No. 372,048, filed December 28, 1940.

My invention relates to change speed transmissions for motor vehicles and more particularly to improved control means therefor.

One of the objects of my invention is to provide an improved control means for a change speed transmission whereby certain gear ratios can be obtained by the manual movement of an operating member and certain other gear ratios can be selectively obtained, in accordance with the position determined by a speed responsive device, by setting said manually-operated operating member in a predetermined position and moving a control member such as the clutch pedal or its equivalent.

Another object of my invention is to provide an improved control means for a conventional three speed forward and reverse gear ratio transmission which will enable the driver to obtain low and reverse speed ratios by the usual movements of a gear shifting lever and clutch pedal and to obtain either second or high speed ratios by setting said lever in a single predetermined position and then operating the clutch pedal, said second or high speed ratio being selectively controlled by a speed responsive device.

Yet another object of my invention is to provide a control means for a change speed transmission which will permit the driver to obtain, by operating a member, one of several speed ratios which are selective by a speed responsive device.

Another object is to provide improved valve means for controlling the speed of movement of a power-operated piston employed to perform the shifting operation whereby the rate of travel of said piston may be retarded while passing through the neutral position in changing from one speed ratio to another, and thus permit the usual synchronizing mechanism of the transmission to efficiently function before the positive clutches of the gearing are moved into mesh, said valve being caused to be operative by the movement of the power-operated piston.

Another object of my invention is to provide improved combined detent and interlocking means between two movable gear shifting members.

A further object of my invention is to provide in a control mechanism of the type referred to, means for manually neutralizing at will any of the speed ratios comprising the transmission gearing, thus permitting proper control of the transmission to facilitate gear ratio changing and also to insure that the operator of the vehicle can be certain of the neutral condition of the transmission when such is desired.

Another object of my invention is to provide power-operated means for shifting the change speed control elements of a transmission and to control said power-operated means by the clutch pedal or its equivalent in combination with means for selecting the speed ratios in accordance with the condition of a speed responsive device.

A still further object of my invention is to provide an improved transmission control mechanism of the type referred to which is so constructed that it can be easily and quickly associated with a standard manually shifted change speed transmission as a replacement accessory and thus permit said transmission to have its speed ratios changed by the driver in an easier, safer, and more efficient manner.

Another object of my invention is to produce an improved change speed transmission control mechanism which is cheap to manufacture and which provides the vehicle operator with all the desirable features of both manual and automatic gear shifting control and at the same time permits the continued use of the well known and reliable change speed gearing embodying interchangeable gears and clutches.

Other objects of my invention will become apparent from the following description taken in connection with the accompanying drawings in which Figure 1 is a side view of a change speed transmission having associated therewith a control mechanism embodying my invention, the parts being in neutral position; Figure 2 is a perspective view of the steering wheel mounted hand lever and associated indicating bracket; Figure 3 is a side view similar to Figure 1 with parts in section and the control mechanism in low gear position; Figure 4 is a partial sectional side view similar to Figure 3, showing the parts in second gear position; Figure 5 is a sectional view of the same parts shown in Figure 4 but moved to high gear position; Figure 6 is a top view of the transmission and control mechanism with the gearing in neutral position and the control mechanism set for automatic operation of second and high speeds; Figure 7 is a view similar to Figure 6, showing the parts moved to high speed position; Figure 8 is a sectional view taken on the line 8—8 of Figure 6, showing the governor-controlled valve in second gear position; Figure 9 is a sectional view taken on the line 9—9 of Figure 6 and showing the governor-controlled valve in high gear position; Figure 10 is a view taken on the line 10—10 of Figure 9, showing certain parts of the control mechanism in neutral position; Figure 11 is a sectional view of the clutch and synchronizing means for high and second speed gear ratios with the parts in high speed positions; Figure 12 is a sectional view showing the manner in which part of the control mechanism is mounted on the steering column; Figure 13 is a view taken on the line 13—13 of Figure 12, parts being shown in section; Figure 14 is a view taken on the line 14—14 of Figure 12; Figure 15 is a sectional view of the governor valve, said view being taken on line 15—15 of Figure 8; Figure 16 is a perspective view of the governor-controlled valve member; Figure 17 is an enlarged view of the valve structure as shown in section in Figure 3; Figure 18 is a perspective view of the hand-controlled shut-off valve; and Figures 19 and 20 are enlarged views of the combined interlock and yieldable detent means between the shifting forks as seen in Figure 10.

My improved control mechanism is especially well adapted for controlling a standard change speed transmission having three forward speeds and a reverse gear. I have, therefore, shown my control mechanism associated with such a change speed gearing but it is to be understood that it can be easily adapted for controlling other types of change speed transmissions.

Referring to Figures 1, 6 and 11, the numeral 1 indicates the engine for driving a motor vehicle, this engine being connected to the wheels of the vehicle by means of the usual clutch (not shown) enclosed within the housing 2 and controlled by the clutch pedal 3 and by means of the change speed gearing generally indicated by the numeral 4. The gearing is connected through suitable shafting and a differential gear to the vehicle wheels as is the usual practice. The change speed gearing is embodied in a housing 5 in which is journaled the driving shaft 6 (connected to one element of the main clutch) and the axially aligned driven shaft 7. The portion of the driving shaft within the gearing housing has secured thereto a gear 8 constantly meshing with a gear 9 of a cluster of gears mounted on a counter-shaft 10 journaled in the housing at one side of the driving and driven shafts. The cluster of gears, in addition to the gear 9, includes a second speed gear 11, a low speed gear 12, and a reverse speed gear 13, the latter being in constant mesh with an idler gear 14. A portion of the driven shaft 7 which extends into the housing is provided with splines 15 upon which is slidably mounted a combined low and reverse gear 16, said gear, when moved forwardly, meshing with the gear 12 to obtain low speed ratio, and when moved rearwardly, meshing with gear 14 to obtain reverse gear drive.

The driven shaft 7 ahead of the splined portion has rotatably mounted thereon a second speed gear 17 which is in constant mesh with the second speed gear 11 on the counter-shaft. The second speed gear 17 is connected to the driven shaft and the driven shaft is connected to the driving shaft in a selective manner by means of a combined clutch and synchronizing means. This structure is well known and need only be briefly described. As best shown in Figures 6 and 11, clutch teeth 18 are provided on the driving shaft and clutch teeth 19 are provided on the gear 17, said teeth being in opposed spaced relation. The portion of the driven shaft between the clutch teeth has secured thereto a splined sleeve 20 having thereon a slidable clutch collar 21 provided with internal teeth for cooperating with the teeth 18 when the sleeve is moved forwardly, or for cooperating with teeth 19 when moved rearwardly. The synchronizing means which is employed to bring either the teeth 18 or 19 and the internal teeth of the collar 21 to substantially the same speed at the time they are engaged comprises synchronizing means 22, one associated with the driven shaft teeth 18 and the other associated with teeth 19 on the second speed gear. Between these two synchronizing members are operating members 23 which lie beneath the clutch collar 21 for operation thereby. Thus when the collar is moved forwardly to engage teeth 18, members 23 will be operated to first operate the synchronizing member 22 to frictionally connect the driving and driven shafts together and then subsequently permit the movement of the collar through the teeth of the synchronizing member to a position engaging teeth 18. Similarly, when collar 21 is moved rearwardly, members 23 will be operated to move the synchronizing member 22 so as to frictionally connect gear 17 to the driven shaft and then subsequently permit the teeth of the clutch collar to pass through the teeth of the synchronizing member and engage teeth 19. In Figure 6 the clutch collar 21 is disengaged from both teeth 18 and 19 and in Figure 11 the clutch collar is shown as being moved forwardly to a position where the driving shaft is directly connected to the driven shaft.

In accordance with my invention I have provided improved means for shifting the collar 21 and the combined low and reverse gear 16 in order to properly control the change of speed ratios of the transmission. In the side closure plate 24 for the gearing housing 5 there is journaled a shaft 25 (best shown in Figure 8) which extends to the exterior of the closure plate and has pinned thereto an operating arm 26. The inner end of this shaft has secured thereto, as by welding, an upwardly extending arm 27 in which is journaled a shifting fork 28 engaging in an annular groove in the combined low and reverse gear 16. Thus when the arm 26 is moved to rotate shaft 25 in a counter-clockwise direction, as viewed from the exterior of the closure plate, the shifting fork 28 will be so moved as to place the gear 16 in mesh with the gear 12 to provide low speed ratio and when the arm is turned in the opposite direction, the shifting fork will move to cause the gear 16 to be placed in mesh with the idler gear 14 to obtain reverse gear ratio.

Also journaled in the closure plate forwardly of the shaft 25 is a second shaft 29 (best shown in Figure 9) and secured to the outer end thereof is a second arm 30 for rotating the shaft. The inner end of the shaft has secured thereto, as by welding, an upwardly extending arm 31 in which is pivotally mounted a shifting fork 32 engaging in a groove in clutch collar 21. Thus when the shaft 29 is rotated in a counter-clockwise direction, as viewed from the exterior of the closure plate, collar 21 will be moved forwardly to cause the driving shaft 6 to be connected directly to the driven shaft 7 to provide direct or high speed ratio, and when the shaft 29 is rotated in the opposite direction, the collar will be moved rearwardly to cause gear 17 to be connected to the driven shaft to provide second speed ratio.

As best shown in Figure 10 (a view of the inside of the closure plate) the closure plate 24 has mounted thereon two companion neutralizing levers 33 and 34. The lever 33 is secured to a shaft 35 journaled in the plate, and the lever 34 is rotatably mounted on a pin 36 carried by the plate. These levers extend upwardly on opposite sides of the arm 31 in which the shifting fork 32 is pivotally mounted. The lever 33 is provided with an integral arm 37 and lever 34 is provided with an integral arm 38, the latter having a circular portion for reception in a circular cutout in the former whereby the two levers will be caused to move together and in opposite directions. The levers are rotated by means of an arm 39 on the exterior end of shaft 35. The construction is such that when arm 39 is turned so as to move the levers toward each other, they will cause the shifting fork 32 to be moved to its central or natural position whereby the clutch collar can be positively disengaged from either teeth 18 or 19 if engaged with either set of teeth. When arm 39 is operated to spread the levers 33 and 34 apart, the shifting fork 32 is then free to be moved by arm 30 and shaft 29. When the levers 33 and 34 are spread apart to their limit of outward travel they will be positioned somewhat beyond the arm 39 when in an operative position. This condition is shown in Figures 4 and 5.

The arm 39 for controlling companion levers 33 and 34, and arm 26 for rotating shaft 25 and moving the combined low and reverse speed gear 16, are both adapted to be controlled from a remote point by means of a single member, said remote point preferably being adjacent the steering wheel of the vehicle. The means for controlling these two arms is best shown in Figures 1, 2, 12, 13 and 15 and comprises a rod 40 connected to arm 39 and a rod 41 connected to arm 26. These rods extend forwardly and upwardly and are connected at their upper ends to arms 42 and 43 mounted on the lower end of a shaft 44 positioned parallel to the steering column 45. The lower end of shaft 44 is journaled in a bearing 46 for both rotative and sliding movement, said bearing being carried by the lower end of the steering column. A cover 47 is provided to enclose the bearing 46 and the inner ends of arms 42 and 43, said cover having the further function of maintaining the arms in a fixed axial position. A spacer sleeve 43' is also provided between the hubs of the arms. The shaft 44 is adapted to be selectively connected to the hubs of arms 42 or 43 by a reciprocable movement of said shaft. The structure performing this function comprises a pin 48 carried by the shaft and slots 49 and 50 in the hubs of the arms.

The upper end of shaft 44 is mounted in a bracket 51 in order to have both a rotative movement and a sliding movement with respect to said bracket. This bracket is carried by the steering column just beneath the steering wheel 52. The bracket has a portion 53 which extends forwardly and upwardly beneath the steering wheel and this portion is provided with a Y-slot 54. The ends of each leg of the slot are designated by letters "R," "Lo" and "Hi" as clearly shown in Figure 2. The central part of the Y-slot at the point where the legs meet is designated by the letter "N." The upper end of shaft 44 has secured thereto a handle 55 extending outwardly to the right side of the steering column, and carried by this handle is an integral indicating finger 56 extending into the Y-slot. A spring 57 is interposed between lever 55 and bracket 51 in order to normally bias shaft 44 downwardly and to a position where pin 48 engages slot 49 to connect the shaft to arm 42. The biasing action of the spring causes the finger to enter the leg of the slot marked "Hi" when the finger is at the N position. To connect shaft 44 to arm 43 it is necessary to move shaft 44 upwardly by lifting on the handle and this can only be done when handle 55 is in a position where the finger is opposite the N position. When the handle is rotated in the direction from the N position to place the finger at the end of the leg of the slot marked "Lo," the arm 43 will be operated and through rod 41, arm 26 will be rotated in a counter-clockwise direction, as viewed in Figure 1, to thus shift the combined low and reverse gear 16 to a position where it meshes with the low gear 12 on the countershaft, thus giving low speed by means of a manual operation. When handle 55 is moved to a position to place the finger at the end of the slot marked "R," arm 43 of rod 41 will rotate arm 26 in the opposite direction and cause the combined low and reverse speed gear to be moved to a position where it meshes with the idler gear and thus cause reverse gear to be obtained. When the handle is moved to place the finger opposite the position marked "N," spring 57 will cause shaft 44 to be moved downwardly so as to connect this shaft to arm 42, this connection being the normal mechanical connection between the shifting handle 55 and the transmission as already noted. When the handle is moved to place the finger 56 at the end of the leg of the slot marked "Hi," arm 39 will be rotated to spread levers 33 and 34 apart, as seen in Figures 4 and 5.

The means employed for shifting clutch collar 21 for obtaining direct drive (high speed ratio) or second speed ratio comprises a suction-operated motor 58 mounted adjacent the exterior of the closure plate by means of a bracket 59. This motor includes a cylinder 60 having reciprocable therein a piston 61 which is connected by a piston rod 62 to arm 30 for rotating shaft 29 which controls shifting fork 32 for the clutch collar 21. When the piston of the section motor is centrally positioned in cylinder 60, the shifting fork will be in a central position where the clutch collar 21 is disengaged from both teeth 18 and 19. This position of the piston is indicated in Figures 1 and 6 and is the neutral position. When the piston is moved to the forward end of the cylinder, shaft 29 will be so rotated as to cause the shifting fork 32 to move the clutch collar 21 forwardly and connect the driving shaft directly with the driven shaft. When the piston is moved to the rear end of the cylinder, the shifting fork will be so moved as to shift the collar rearwardly and connect the second speed gear 17 to the driven shaft.

The source of suction for operating the suction motor is that present in the intake manifold of the engine 1, and in order to control the suction and properly operate the suction motor to perform the shifting of the clutch collar, there are provided four valves generally indicated by the letters A, B, C and D. The valve A is adapted to be controlled by clutch pedal 3, the conditioning valve B by lever 34 of the two companion levers mounted on the inside of the closure plate, the valve C by the shifting fork 32, and the governor controlled valve D by a speed responsive device which is preferably driven from the countershaft of the gearing although it may be driven from the driven shaft of the vehicle if found desirable. In the preferred arrangement of the valves the governor-controlled valve D is placed next to the suction motor in the line of communication between the manifold and said motor. The speed responsive device for controlling this valve is mounted in a casing 63 secured to the side of the transmission housing opposite that of the closure plate 24 (see Figures 8 and 9). The casing is provided with a guide portion 64 screwed into the transmission casing, said guide portion acting as a bearing for a shaft 65 having a gear 66 on its inner end meshing with a gear 67 secured to the cluster of gears on the countershaft between gears 9 and 11. The outer end of shaft 65 lies in the casing 63 and has pivotally mounted thereon governor fly-weights 68 which are connected to a slidable sleeve 69 mounted on shaft 65 and acted on by a spring 70 positioned between the sleeve and adjustable nuts 71. By adjusting the nuts 71 the speed of shaft 65 at which the weights move from their closed position to open position (Figures 8 and 9) can be varied. A cover-plate 63' is attached to casing 63 in which is an atmospheric porthole 77' covered by a screen.

The sleeve 69 is grooved and receives an arm 72 of a valve element 73 slidable in a bore 74 of the housing 63. This bore has a port 75 which is connected by a conduit 76 with the rear end of cylinder 60 of the suction motor. The bore is also provided with a port 77 which is connected by a conduit 78 with the forward end of cylinder 60 of the suction motor. A third port 79 positioned intermediate ports 75 and 77, is connected by a conduit 80 with the valve C. A passage 75' places the inner end of bore 74 in communication with the interior of casing 63. The valve element 73 (shown in detail in Figure 16) is of cylindrical construction and provided with recesses 81 and 82 adapted to communicate with each other by an intermediate cut-away portion 83. The recesses 81 and 82 are so spaced apart as to selectively connect central port 79 with ports 75 and 77. When the fly-weights 68 are adjacent the shaft, the valve element will be so positioned that conduit 76 will be connected with conduit 80, thereby placing the rear end of cylinder 60 in communication with the source of suction. These positions of the valves and weights are shown in Figure 8. When the weights 68 are thrown outwardly by a predetermined speed of rotation of the counter-shaft of the gearing, the valve element will be so positioned that conduit 78 will be connected with conduit 80, thereby placing the forward end of the cylinder of the suction motor in communication with the source of suction. These positions of the valve elements and weights are shown in Figure 9. In practice the position of the fly-weights in Figure 9 will not be obtained until the countershaft is rotating at a speed which is equivalent to about 18 miles per hour vehicle speed. This condition can be varied by adjusting the tension of spring 70.

The three valves A, B and C are all mounted as a unit on the exterior of the closure plate 24 and are arranged between conduit 80 leading from the speed responsive valve D and conduit 84 leading to the manifold, valve A being closest to the manifold, valve B next, and valve C third. The relationship between the three valves and their positions on the closure plate is best shown in Figures 3, 4 and 5 whereas Figure 17 shows an enlarged sectional view of the three valves. The valves are all mounted in a single casing 85 which has at its forward end a vertical bore 86 in which valve element 87 of the pedal controlled valve "A" is reciprocably mounted. This valve element is formed on the end of a square rod 87' which is slidable in a square guide axially aligned with the bore 86. The lower end of the rod carries a roller 88 which is engageable by an arm 89 integral with the clutch pedal 3. The valve element 87 is biased to its lower position by a spring 90 interposed between the valve element and a closure plug 91 which has an air relief opening 92 therein closed by a screen 93. The valve element 87 is formed with an annular recess 94 for placing the port 95 connected to the conduit 84 leading to the manifold with the passage 96 leading to a bore 97 which is at right angles to bore 86. The bore 97 is also connected by a passage 98 to bore 86 at a point above the passage 96. The valve element 87 also has a cutout portion 99 which permits passage 98 to be in communication with the atmosphere through the opening 92 at the upper end of bore 86. This cutout portion is also capable of connecting the passage 96 to the atmosphere when the valve element 87 is in its lower position where it is normally biased by spring 90. When in its lower position the valve element also positions the annular recess portion 94 so that port 95 and passage 96 are cut off from communication with each other. The lower position of the valve element 86 is shown in Figure 3, and its upper position is shown in Figures 4, 5 and 17.

The cross-bore 97 receives a cylindrical valve element 100 (shown in perspective in Figure 18) which is the movable valve element of the conditioning valve B. This valve element carries an arm 101 which is connected to neutralizing lever 34 by means of a slot 102 receiving a pin 103 carried by the lever. The valve element 100 is provided with a cross-passage 104 and a slot 105. A groove 100' cooperates with a stake pin 101' (Figure 17) to hold the valve element in the bore. When the valve is in a position where the cross-passage 104 places passage 96 in communication with a passage 106 leading to conduit 80, slot 105 will be in a position to prevent connection between the passage 98 and passage 106. When the valve element is turned in a clockwise direction in order to shut off passages 104 and 96, passage 98 will be in communication with passage 106.

The casing 85 is also provided with a vertical bore 107 with which passage 106 communicates. Within this bore is a valve element 108 which is the movable valve element of the restricting valve C. This valve element has an annular recess 109 for controlling communication between the passage 106 and port 110 to which is connected conduit 80 leading from the valve D. The valve element 108 is normally biased downwardly by a spring 111 interposed between the valve element and a closure plug 112. The lower end of the valve element projects out of the bore and is adapted to be engaged by a cam 113 in the form of a lug carried on arm 30 which is secured to shaft 29 (see Figure 9). This cam 113 when engaging the valve element 108 moves it upwardly so as to restrict only the flow of air between passage 106 and the port 110. When cam 113 permits the valve element to move downwardly under the action of spring 111, there will be no restriction of flow of fluid between passage 106 and port 110.

In order to prevent either the combined low and reverse gear 16 or the clutch collar 21 from being placed in an operative position when the other is in operative position, I have also embodied in my control mechanism an interlocking mechanism which has combined therewith yieldable detent means for holding either the combined low and reverse gear or the clutch collar in their different positions. The structure employed is shown in detail in Figures 10, 19 and 20. The arm 27, to which the shifting fork 28 is pivotally mounted, is provided with a flange 115 and likewise the arm 31, to which the shifting fork 32 is pivoted, is provided with a flange 114. Flange 114 has three recesses 116, 117 and 118, and flange 115 has three recesses 119, 120 and 121. Positioned between the flanges is a T-shaped member 122 pivotally mounted on the inside of the closure plate by a pin 123 (see Figure 10). The cross leg of this member is provided with a bore 124 and carried thereby are two balls 125 and 126 between which is interposed a spring 127. The ball 126 is adapted to cooperate with the recesses 116, 117 and 118 and the ball 125 is adapted to cooperate with the recesses 119, 120 and 121. Also interposed between the two balls is a pin 128 which is of such length as to permit only one of the balls to be moved out of a recess at one time.

The flange 114 on each side of recess 117 is provided with flat surfaces 129 lying in a single plane, and likewise flange 115 on each side of the central recess 120 is provided with flat surfaces 130 lying in a single plane. The surfaces on each side of the recesses 116, 118, 119 and 121 are curved and when presented opposite a flat surface, the member 122 is not pivotally movable as when the flat surfaces are opposite each other. These surfaces are adapted to cooperate with the cross leg of member 122 for locking a shifting fork in a neutral position whenever the other shifting fork is moved out of a neutral position to place a transmission element in operative position. This is best shown by reference to Figures 19 and 20. In Figure 19 the parts are in the neutral position of the transmission and, therefore, ball 125 is in the central recess 120 and ball 126 is in recess 117. Under these conditions the member 122 has a predetermined amount of pivotal play between the flat surfaces 129 and 130. However, when arm 31 is, for example, rotated so as to place the clutch collar 21 in high speed position, ball 126 will be placed in recess 118 (Figure 20). Because of the curved contour of the flange 114 on each side of said recess 118, the member 122 will now be forced against the flat surfaces 130 thereby making it impossible for arm 27, which carries flange 115, to be rotated. The same condition would prevail if arm 31 were rotated so as to place ball 126 in recess 116. On the other hand if arm 31 is in neutral position and arm 27 rotated so that ball 125 would rest either in the recess 119 or recess 121, then member 122 would be forced, by the curved contour of flange 115, into engagement with the flat surface 129. Under these conditions arm 31 cannot be rotated.

The ends of flange 114 are provided with stops 131 for engagement with the member 122 to limit the relative movement of arm 31 in either direction. Similarly, stops 132 are provided on flange 115 for cooperation with member 122 to limit the rotative movement of arm 27 in either direction. Since balls 125 and 126 are spring-pressed into the recesses, they will tend to hold arms 27 and 31 in all positions they may assume in controlling the transmission.

Referring now to the operation of my novel control mechanism, the transmission, when in neutral position, will be as shown in Figures 1 and 6. In Figure 1 the clutch pedal will be in clutch-engaged position when in the right-hand dotted position and in clutch-disengaged position when moved to the central position also indicated by a dotted line. The clutch is also disengaged when the clutch pedal is fully depressed as shown in full lines in Figure 1. In the neutral condition of the transmission the gear shifting handle 55 will be in a position where the indicating finger 56 is in the N position. The shaft 44 will be biased downwardly in order to connect it with arm 42, as shown in Figures 12 and 13. If the vehicle is stopped when the transmission is in neutral position, the fly-weights will be in the position shown in Figure 8.

If it is desired to shift into reverse gear drive, the clutch pedal is depressed either to its central position or to its full position, as shown in Figure 1. The raising of the valve element 87 by the clutch pedal will have no effect in connecting the suction motor to the manifold since the valve element 100 is closed as shown in Figures 3 and 17. Next, the handle 55 is pulled toward the steering wheel to thus axially move shaft 44 upwardly in order to connect it with arm 43. The gear shifting handle is then rotated in a counter-clockwise direction to place the finger at the end of the slot marked "R." This movement of the handle will cause shaft 44 to be rotated and by means of rod 41, arm 26, shaft 25, arm 27, and shifting fork 28 the combined low and reverse gear 16 will be moved rearwardly into engagement with the reverse gear idler 14. When the clutch pedal is released to engage the clutch, the engine will be capable of driving the vehicle in a reverse direction.

When it is desired to place the transmission in low speed ratio, the clutch is first disengaged and then the gear shifting handle is moved to place the finger in the end of the slot marked "Lo." This will cause the low and reverse speed gear 16 to be shifted forwardly by means of the same connection employed in shifting the gear rearwardly. The gear 16 is then meshed with gear 12. When the clutch is engaged, the wheels of the vehicle will be driven forwardly through the low speed gear ratio. Low gear position is shown in Figure 3 (clutch pedal in initial disengaged position).

During low speed ratio driving the countershaft is rotated with the wheels of the vehicle and, therefore, the fly-weights of the governor will have a tendency to be thrown outwardly due to the rotation of shaft 65 upon which they are pivotally mounted. These weights, however, will not be thrown outwardly against the action of spring 70 until the speed of the vehicle reaches a value of approximately 18 miles per hour. As long as the weights remain in their closed position, as shown in Figure 8, the rear end of the suction motor cylinder will be in communication with conduit 80 leading from the manifold through the valves A, B, and C. The forward end of the cylinder of the suction motor, due to the position of the valve element 73, will be connected to atmosphere through port 77, casing 63, and atmospheric port 77'. Suchtion will not be effective in the rear end of the cylinder of the suction motor under these conditions due to the fact that the valve element 87 of valve A is in its lower position as shown in Figure 3, this lower position being the normal position of the valve whenever the clutch pedal is in a position to engage the clutch or is depressed to its central position shown in dotted lines in Figure 1. It is only when the clutch pedal is moved beyond the initial clutch-disengaged position and to a position where the foot pad is adjacent the floorboard (as indicated by full lines in Figure 1) that the valve element 87 of valve A is moved upwardly in order to connect the manifold to conduit 80 leading to valve D and the two ends of the cylinder of the suction motor. However, it is also to be noted that even with an open condition of valve A, communication to the suction motor will still be dependent upon the condition of the valve B which will always remain closed, as shown in Figure 3, as long as the gear shifting handle is in its neutral position or in either the low or reverse speed position. However, when the gear shifting handle is moved in order to place the indicating finger 56 in the end of the slot marked "Hi," the valve element 100 of valve B will be caused to assume an open position as shown in Figures 4 and 5 and the levers 33 and 34 will move outwardly away from each other to their limit of travel as shown.

With the vehicle now moving and the transmission in low speed ratio and it is desired to place the transmission in one of its top speed ratios (second or direct drive) which is marked "Hi," the clutch is disengaged by moving the clutch pedal to its fully depressed position, shown in full lines in Figure 1, this position being beyond the position where the clutch is initially disengaged. Next, the gear shifting handle is moved so that the indicating finger is moved out of the end of the slot marked "Lo" to the N position, thus disengaging the combined low and reverse gear 16. When the indicating finger is in the position marked "N," spring 57 will be permitted to operate to move the shaft 44 downwardly and thus place finger 56 in a position so that it can move into the end of the slot marked "Hi." The action of the spring also disconnects arm 43 from the shaft and connects arm 42 to the shaft. Clockwise rotation of handle 55 now causes arm 42 to be rotated and with it arm 39 through the connecting rod 40. The arm 39 will be moved in a clockwise direction as viewed in Figure 1 and since the companion levers 34 and 35 are controlled by this arm, they will be simultaneuosly moved away from each other to the limit of their travel and to the positions shown in Figures 4 and 5. Since the valve element 100 of valve B is connected to lever 34, movement of this lever will place said valve element in the position shown in Figures 4 and 5 which permits air from the suction motor to be drawn into the manifold, provided, of course, the valve element 87 of the valve A is open which will be the case since the clutch pedal is fully depressed. Thus by the opening of valve element 100 of the conditioning valve B the power shifting means is conditioned for operation. The moving of valve element 100 to the position shown in Figures 4 and 5 causes slot 105 to be moved to such a position that passage 98 leading to atmosphere will be cut off from conduit 80 leading to the suction motor through valve D. Thus it is seen that with the clutch pedal fully depressed and the gear shifting handle moved so that finger 56 is in the end of the slot marked "Hi," the manifold will be in direct communication with conduit 80. The valve element 108 of valve C will be effective to restrict flow of air from conduit 80 to the manifold since under these conditions the cam 113 will hold the valve element upwardly in the position shown in Figure 17, this being the position corresponding to the neutral position of the clutch collar 21 and its shifting fork 32.

Assuming that the speed of the vehicle is below the selected value of 18 miles per hour, then as soon as the gear shifting handle assumes a position where the finger is in the end of the slot marked "Hi," the suction of the manifold will be effective to draw air out of the rear end of the cylinder of the suction motor since the valve element 73 of valve D is in the position shown in Figure 8. The front end of the cylinder is in communication with the atmosphere and, therefore, the piston of said motor will be moved rearwardly and this will cause arm 30 to be rotated in a clockwise direction as viewed in Figure 1. Rotation of this arm will cause the shifting fork 32 and the clutch collar to be moved rearwardly as viewed in Figure 6. This will cause the synchronizer member to be operated and the teeth of the clutch collar to engage clutch teeth 19 of gear 17 to connect said gear to the driven shaft and thereby obtain second speed ratio. The movement of the piston of the suction motor will be fairly slow at the beginning of the stroke due to the fact that the valve element 108 of valve C restricts the flow of air from the suction motor. However, as soon as the shifting fork has been moved a sufficient distance to permit cam 113 to move out from beneath the valve element 108, this valve element will have less restricting action and the air in the suction motor will be pulled out at a greater rate. Thus the piston will apply greater power which will be sufficient to operate the synchronizer and place the clutch collar in a position to connect the gear to the driven shaft. With the transmission in second speed ratio, the clutch can now be released to permit power to be appplied to the wheel of the vehicle. When the clutch is released, the valve element 87 of valve A is returned to its lower position, thereby cutting off the suction motor from the manifold.

If the speed of the vehicle is above the selected speed of 18 miles per hour when the clutch pedal is fully depressed and the finger of the gear shifting handle is placed in the end of the slot marked "Hi," then the valve element 73 of valve D will be in the position indicated in Figure 9 due to the fact that the fly-weights 68 are thrown outwardly against the action of spring 70. This position of valve element 73 results in the forward end of the suction motor being in communication with conduit 80 leading to the manifold instead of the rear end of the cylinder, said rear end now being in communication with the atmosphere through the passage 79, the casing 63, and the atmospheric port 77'. The piston will now be moved forwardly instead of rearwardly and consequently the shifting fork 72 will be shifting forwardly and thus cause the clutch collar to connect the driving shaft directly with the driven shaft. Thus it is seen that high speed ratio will be obtained and the second speed ratio will be "skipped."

If the transmission should be in second speed, as already described, and high speed ratio is then desired, such speed cannot be obtained until the speed of the vehicle reaches a value above the selected speed of 18 miles per hour. However, when the speed of the vehicle is right (above 18 miles per hour) all that is necessary to obtain high speed or direct drive is to depress the clutch pedal fully beyond the initial clutch-disengaged position. This will cause the valve element 87 of valve A to be placed in open position in order to connect the forward end of the cylinder of the suction motor to the manifold to accomplish the shift.

As the piston of the suction motor moves from the rear end of the cylinder to the forward end thereof, it will pass through the central position which is the disengaged or neutral position of the clutch collar. As the piston approaches the central position, cam 113 will become operative to move the valve element 108 of valve C upwardly and restrict the flow of air between conduit 80 and the manifold. This will slow up the movement of the piston and permit time for proper operation of the synchronizing means associated with the clutch collar. As soon as the piston begins to approach the forward end of the cylinder, cam 113 will move from beneath the valve element 108 and allow air to be pulled out of the suction motor at a greater rate to complete the shift. It is thus seen that the restricting action of valve element 108 is very effective in producing a quiet shift without the clashing of teeth by permitting slower action and time to allow for operation of the synchronizing means. The suction motor will act in a manner closely approximating that which is possible by manual operation of a gear shift lever.

With the transmission in high speed ratio or direct drive, it will remain in this condition as long as the speed of the vehicle is above 18 miles per hour. Under these conditions the valve element 73 of valve D will always be in a position to connect the forward end of the cylinder of the suction motor with the manifold. Disengaging the clutch will in no way affect the high speed condition. However, if the speed of the vehicle should drop below the 18 miles per hour, then the valve element 73 will assume the position shown in Figure 8 and connect the rear end of the cylinder of the suction motor to conduit 80 leading to the manifold. If the clutch pedal is fully depressed under these conditions, the piston of the suction motor will be moved to the rear end of the cylinder and the transmission then placed in second speed condition in a manner already described. Whenever the transmission is shifted from either second speed ratio to high speed ratio or from high speed ratio to second speed ratio, the restricting valve 108 will always be operated to properly slow down the speed of movement of the piston of the suction motor as it passes through the intermediate portion of its path of travel from one end of the cylinder to the other.

When it is desired to place the transmission in neutral with either second speed ratio or high speed ratio operative, all that is necessary is to move the clutch pedal to a position where the clutch is either initially disengaged or to its fully depressed position and then move the gear shifting handle to a position where the indicating finger is opposite N. This will cause the two companion levers 33 and 34 to be moved toward each other and if the transmission is in high, lever 34 will pick up the shifting fork 32 and move the clutch collar to the neutral position. If the transmission is in second speed ratio, lever 33 will pick up the shifting fork 32 and move the clutch collar to neutral position. As soon as lever 34 begins to move toward lever 33 and before the shifting fork is picked up by either lever 33 or 34, it will rotate valve 100 and cause slot 105 to connect conduit 80 with the atmosphere through conduit 85. Both ends of the cylinder of the suction motor will now be connected to atmosphere regardless of the position of the valve element 73 of valve D. This will permit the piston of the suction motor to be easily moved with the shifting fork 32 to its central position where the clutch collar is disengaged. It is thus seen that the transmission can always be neutralized regardless of its operative condition by merely moving the handle to a position where the indicating finger is opposite the point marked N.

By having the fly-weights connected to be controlled by the speed of the countershaft, it is possible to shift the transmission from high speed to second speed even though the speed of the vehicle may be greater than 18 miles per hour. This condition may arise if the vehicle is going down-hill in high speed and it is desired to get it in second speed gear. When such a condition arises, second speed gear is obtained by depressing the clutch pedal and then moving the gear shifting handle to the position where the finger is opposite N. The transmission is now disconnected from the engine and also from the wheel of the vehicle and, therefore, the countershaft is no longer driven. The oil of the transmission will slow down the speed of the countershaft quite rapidly and when it reaches a point where the fly-weights assume their closed position, the valve element 73 of valve D will be in a position to connect the rear end of the cylinder of the suction motor to conduit 80 leading to the manifold. If the gear shifting handle is now moved to again place the finger in the end of the slot marked "Hi" and the clutch pedal is fully depressed (if not already so depressed) the suction motor will operate in order to connect the second speed gear to the driven shaft. By immediately releasing the clutch pedal, second speed gear ratio will remain engaged since the suction motor will be cut off from the manifold. Thus any speeding up of the countershaft to again shift the valve element 73 of valve D back to the position shown in Figure 9 will not change the speed ratio.

The interlocking and detent mechanism functions in a manner already described. The spring-pressed balls hold the shifting forks in both their neutral and operative positions. Also, the interlocking pivoted member 122 prevents either shifting fork from being moved from neutral position whenever the other shifting fork is in an operative position.

From the above description it is apparent that I have produced a change speed transmission control mechanism which permits the operator to properly control the transmission at all times and with a minimum of effort. The low and reverse gear ratios are manually controlled which is not objectionable since these gear ratios are used less than the other gear ratios. The high and second gear ratios are semi-automatically controllable. One setting of the gear shifting handle is all that is required for both speed ratios. The selection of the speed ratio of these two top speeds is made by the speed of the vehicle but the actual change is not made except at the will of the operator. Thus one is able to obtain the speed ratio he desires but then only if such a speed ratio is proper for a given speed of the vehicle. If it is desired to remain in high speed ratio, one can do so notwithstanding the speed of the vehicle drops to a value to select second speed ratio. Also, if it is desired to remain in second speed ratio and speed up the vehicle above the point where high is selected, such can be done. The actual shifting is accomplished quickly and easily by merely fully depressing the clutch pedal. Once the gear shifting handle is set in the Hi position it need no longer be touched unless it is desired to obtain low gear, reverse gear or neutral. Also, there is no danger of the operator not knowing the operative or inoperative condition of the transmission. He knows positively that it will be in neutral whenever the finger 56 points to N. Also, it is possible by means of the control mechanism to "skip" second speed gear ratio when starting the vehicle from a stopped position if such is desired. All that need be done is to speed up the car in low gear to a point where the valve D selects direct drive and then fully depress the clutch pedal.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a control mechanism for a change speed transmission provided with two gear ratios, a main clutch operating pedal, means controlled by said clutch pedal when moved to a clutch disengaging position for establishing the gear ratios, means responsive to the speed of a member of the transmission for determining which gear ratio will be established by the pedal-controlled means when operated, manual means independent of the clutch pedal for manually neutralizing by operator effort an established gear ratio, and means operable by the manual means when moved to the position to neutralize a gear ratio for preventing the re-establishment of either gear ratio by said clutch pedal controlled means when the clutch pedal is moved to a clutch disengaged position.

2. In a control mechanism for a change speed transmission provided with a member shiftable to two positions in opposite directions from a central neutral position to thereby obtain different speed ratios, a power-operated device for shifting said member, means for conditioning the power-operated device for operation, speed responsive control means for determining in which direction the power-operated device will shift said member, manually-controlled means for causing said power-operated device to operate, other independent manually-controlled means operable at will for causing said shiftable member to be placed in its neutral position when in an operative position but incapable of placing the shiftable member in an operative position by manual effort, said last named means including a mechanical connection for transferring manual effort to the shiftable member and means for controlling the conditioning means by the independent manually-controlled means so that it will be conditioned when said manually controlled means is in a position other than neutral position.

3. In a control mechanism for a change speed transmission provided with two gear ratios, a power-operated device for establishing either of said two gear ratios, control means for determining which gear ratio the power-operated device will establish, means for conditioning the power-operated device for operation, movable control means for causing said power-operated device to operate, other independent manually-controlled means operable at will for causing by manual effort the neutralizing of an established gear ratio but being incapable of establishing a gear ratio by manual effort and means for controlling the operativeness of the conditioning means by said other independent manually-controlled means when in other than neutral position.

4. In a control mechanism for a change speed gearing provided with a member shiftable to two positions in opposite directions from a central neutral position to thereby obtain different speed ratios, means comprising a single movable element for moving said member to its operative positions, means for disabling said moving means, control means for said moving means, two members movable in opposite directions, said members when moved to positions adjacent each other cooperating with the shiftable member to place it in neutral position and when moved to positions away from each other permitting said shiftable member to be freely moved by said moving means therefor, and manually-controlled means forming the sole means for moving said two movable members simultaneously to positions adjacent each other, said manually-controlled means also being connected to operate the disabling means for the moving means prior to moving the two members.

5. In a control mechanism for a change speed gearing provided with a member shiftable to two positions in opposite directions from a central neutral position to thereby obtain different speed ratios, means for moving said member to its operative positions comprising a fluid motor, control means for said last named means, two members movable in opposite directions, said members when moved to positions adjacent each other cooperating with the shiftable member to place it in neutral position and when moved to positions away from each other permitting said shiftable member to be freely moved by said moving means therefor, manually-controlled means for moving said two movable members simultaneously, and means comprising a valve operable by the manually-controlled means for determining the operativeness of the motor when the two members are moved to positions away from each other and the inoperativeness of the motor when the two members are initially moved to positions adjacent each other.

6. In a control mechanism for a change speed transmission provided with a member shiftable to two operative positions to establish two gear ratios, a power-operated device for establishing the gear ratios, means for conditioning the power-operated device for operation, control means for causing said power-operated device to be operated including a single operated member movable through the same path of travel for obtaining either operative position, and manually-controlled means independently operable of the last named control means for neutralizing at will and solely by manual effort either of said gear ratios, said last named means being incapable of manually establishing a gear ratio, and means for controlling the conditioning means by the last named manually-controlled means when in other than neutralizing position.

7. In a control mechanism for a change speed transmission provided with means whereby either of two gear ratios may be made operative or inoperative, means including a fluid motor for establishing said gear ratios, control means including a manually-controlled valve for causing said motor to establish either of said gear ratios, and manually-controlled means independently operable of the last named control means for disabling the operation of the fluid motor by its control means and for thereafter manually causing at will either of the gear ratios to be inoperative.

8. In a control mechanism for a change speed transmission provided with means whereby either of two gear ratios may be made operative or inoperative, means including a fluid motor for establishing said gear ratios, control means including a manually-controlled valve for causing said motor to establish either of said gear ratios, manually-controlled means independently operable of the last named control means for manually causing at will either of the gear ratios to be inoperative, and valve means movable by the manually-controlled means to a closed position for preventing the motor from being operated when the gear ratios are caused to be inoperative.

9. In a control mechanism for a change speed transmission provided with a member shiftable to two operative positions to establish two gear ratios, a power-operated device for shifting said member, control means including a control device controllable at will to a single operative position for causing said power-operated device to move said member to an operative position, manually-controlled means settable in one position for conditioning said control means to cause operation of said power means and settable in another position for preventing said control means from causing operation of said power means, and means operable when said manually-controlled means is moved to the last named settable position from the first named settable position for causing by manual effort an operative gear ratio to be inoperative.

10. In a control mechanism for a change speed transmission provided with two gear ratios, a fluid motor connected to establish either gear ratio, a source of differential pressure, valve means for selectively connecting the opposite ends of the motor to the source, two other valve means each of which is capable of placing the source in communication with the motor through the selective valve means and cutting it off, movable control means for controlling one of said other valve means, and independent manual means for controlling the second of said other valve means, said last named manual means also being operatively connected to the transmission to cause an operative gear ratio to be neutralized by a manual force after said manual means is moved to a position causing its valve means to be in a "cut off" position.

11. In a control mechanism for a change speed transmission provided with means whereby two gear ratios may be made operative or inoperative, a fluid motor for establishing either of said gear ratios, a source of differential fluid pressure, conduit means between said source and the motor, speed responsive controlled valve means associated with said conduit means for connecting said source to the motor so as to cause the motor to be operated in opposite directions, a manually-controlled valve in said conduit means between said speed responsive control valve means and the source, a third valve means, manual means for controlling said third valve means, and means operable by said manual means when in valve closed position for manually causing at will either of the gear ratios to be inoperative.

12. In a control mechanism for a change speed transmission provided with a member shiftable to two positions in opposite directions to thereby obtain different speed ratios, a suction motor connected to the shiftable member, a source of suction, conduit means between the source and opposite ends of the motor, three valves positioned in series in said conduit means for controlling the operation of the suction motor, one of said valves being movable to two positions to alternately connect opposite ends of the motor to the source, the other two of said valves each being movable to either open or close said conduit means, manual means for controlling one of said two valves, other independent manual means for controlling the second of said two valves, and a connection from said last named manual means for causing an operative gear ratio to be neutralized by manual effort when said controlled valve is closed.

13. In a control mechanism for a change speed transmission provided with a member shiftable to two positions in opposite directions from a central neutral position to thereby obtain different speed ratios, a main clutch operating pedal, a suction motor connected to the shiftable member, a source of suction, conduit means between the source and opposite ends of the motor, three valves positioned in series in said conduit means for controlling the operation of the suction motor, one of said valves being movable to two positions to alternately connect opposite ends of the motor to the source, the other two of said valves each being movable to either open or close said conduit means, means for controlling one of said two valves by the clutch pedal so as to be closed when the clutch is engaged and open when the clutch is disengaged, other manual means settable in two positions for opening and closing the second of said two valves, and a mechanical connection between said last named manual means and the shiftable member for causing said shiftable member to be manually placed in neutral position when said manual means is set to cause the valve controlled thereby to be closed.

14. In a control mechanism for a change speed transmission provided with a member shiftable to two positions in opposite directions from a central neutral position to thereby obtain different speed ratios, a main clutch operating pedal, a suction motor connected to the shiftable member, a source of suction, conduit means between the source and opposite ends of the motor, three valves positioned in series in said conduit means for controlling the operation of the suction motor, one of said valves being movable to two positions to alternately connect opposite ends of the motor to the source, the other two of said valves each being movable to either open or close said conduit means, means responsive to the speed of a member of the transmission for controlling the position of said first valve, means for controlling one of said two valves by the clutch pedal so as to be closed when the clutch is engaged and open when the clutch is disengaged, other manual means settable to two positions for opening and closing the second of said two valves, and a mechanical connection between said last named manual means and the shiftable member for causing said shiftable member to be in neutral position when said manual means is set to cause the valve controlled thereby to be closed, said mechanical connection being ineffective to move said shiftable member from a neutral position to an operative position.

15. In a control mechanism for a change speed transmission provided with one member shiftable to two positions for obtaining low and reverse speed ratios and a second member shiftable to two positions for obtaining second and high speed ratios, a manual member mechanically connected to manually shift the first member to either position and comprising the sole shifting means therefor, means for shifting the second member to either position, speed responsive means driven by a member of the transmission for determining to which position said second member will be shifted by its shifting means, conditioning means for determining the operativeness of the shifting means for the second member, driver controlled means for causing said shifting means to be operable, means controlled by the manual member when placed in a position other than neutral or a position operating the first named shiftable member for operating the conditioning means and permitting said driver controlled means to control the shifting means.

16. In a control mechanism for a change speed transmission provided with one member shiftable to two positions for obtaining low and reverse speed ratios and a second member shiftable to two positions for obtaining second and high speed ratios, a manual member mechanically connected to manually shift the first member to either position, means for shifting the second member to either position, speed responsive means driven by a member of the transmission for determining to which position said second member will be shifted by its shifting means, driver controlled means for causing said shifting means to be operative, means controlled by the manual member when placed in a position other than neutral or a position operating the first named shiftable member for permitting said driver controlled means to control the shifting means, and means controlled by said manual member when placed in still another position for positively causing the second shiftable member to be placed in an inoperative position by manual effort.

17. In a control mechanism for a change speed transmission provided with one member shiftable to two positions for obtaining low and reverse speed ratios and a second member shiftable to two positions for obtaining second and high speed ratios, a manual member connected to manually shift said first member to either position, a clutch pedal, means controlled by the clutch pedal when moved to disengaged position for shifting said second member, means for conditioning the last named means for operation, and means operable by the manual member when placed in a position other than neutral or a position operating the first named shiftable member for controlling the conditioning means and permitting said clutch pedal controlled means to be operated by movement of the clutch pedal.

18. In a control mechanism for a change speed transmission provided with one member shiftable to two positions for obtaining low and reverse speed ratios and a second member shiftable to two positions for obtaining second and high speed ratios, a manual member connected to manually shift said first member to either position, a clutch pedal, means controlled by the clutch pedal when moved to disengaged position for shifting said second member, means operable by the manual member when placed in a position other than neutral or a position operating the first named shiftable member for controlling means permitting said clutch pedal controlled means to be operated by movement of the clutch pedal, and means operable by the manual member when set in still another position for manually moving the second shiftable member to an inoperative position if operative and for also disabling the clutch pedal controlled means so as to be inoperative when the clutch pedal is moved to clutch disengaged position.

19. In a control mechanism for a change speed transmission provided with one member shiftable to two positions for obtaining low and reverse speed ratios and a second member shiftable to two positions for obtaining second and high speed ratios, a manual member connected to shift said first member to either position, a fluid motor connected to shift the second member to either position, a source of differential pressure connected to operate the motor, control means for the motor including a manually-operated valve, and conditioning valve means controlled by the manual member when placed in a position other than neutral or a position operating the first named shiftable member for permitting said control means to control the operation of the motor.

20. In a control mechanism for a change speed transmission provided with one member shiftable to two positions for obtaining low and reverse speed ratios and a second member shiftable to two positions for obtaining second and high speed ratios, a manual member connected to shift said first member to either position, a fluid motor connected to shift the second member to either position, a source of differential pressure connected to operate the motor, control means for the motor including a manually-operated valve, conditioning valve means controlled by the manual member when placed in a position other than neutral or a position operating the first named shiftable member for permitting said control means to control the operation of the motor, and other means controlled by said manual member when moved out of said last named position for causing the second shiftable member to be inoperative by operator effort.

21. In a control mechanism for a change speed transmission provided with two gear ratios, a power-operated mechanism for establishing either of said two gear ratios, operator-operated means settable in a predetermined position for conditioning the power-operated mechanism for operation, control means for causing said power-operated mechanism to operate, means for determining which gear ratio the power-operated mechanism will establish when the control means is operated, and means operated by the operator-operated means when moved from said predetermined position to another position for causing by operator effort the neutralization of an established gear ratio, said last named means being operable solely by operator effort and not actuated by the power-operated mechanism for establishing the speed ratios.

22. In a control mechanism for a change speed transmission provided with two gear ratios, a power-operated mechanism for establishing either of said two gear ratios, control means for causing said power-operated mechanism to operate, means for determining which gear ratio the power-operated mechanism will establish when the control means is operated, operator-operated means operable at will and independently of the control means for the power-operated mechanism for causing by operator effort the neutralization of an established gear ratio, said last named means being operable solely by operator effort and not actuated by the power-operated mechanism for establishing the speed ratios and means so controlled by the operator-operated means that the power-operated mechanism will be disabled before the gear ratios are manually neutralized by the operator-operated means.

23. In a control mechanism for a change speed transmission having at least three gear ratios, means comprising power-operated means for establishing either of two of said gear ratios, manually-operated control means operable at will for controlling the operation of the power-operated means, means including independent manually-operated member for manually establishing and neutralizing the other speed ratio, means for conditioning said power-operated means for operation by a movement of the last named manually-operated member to a position other than that required to establish the said other speed ratio, and means for manually neutralizing either of said two gear ratios at will by operator effort and by a return movement of the said independent manually-operated member to the position where the said other speed ratio is neutralized.

24. In a control mechanism for a change speed transmission having at least three gear ratios, means comprising power-operated means for establishing either of two of said gear ratios, means including a manually-operated member for manually establishing and neutralizing the other speed ratio, means for conditioning said power-operated means for operation by said manually-operated member when moved to a position other than where said other gear ratio is either established or neutralized, means for controlling the operation of the power-operated means at will, and means for manually neutralizing either of said two gear ratios and disabling the power-operated means at will by a return movement of the manually-operated member to neutral position.

25. In a control mechanism for a change speed transmission provided with two gear ratios, control means for establishing said gear ratios including a power-operated member movable back and forth between two operative positions and through a central inoperative position, a manual member independent of the control means and having a normally inoperative position, means operable by said manual member when moved from the inoperative position to another position for conditioning said control means to be operative, and mechanical connecting means operable when the manual member is moved back to its inoperative position for first disabling the power-operated member and then positively neutralizing by manual effort either gear ratio if operative and independently of any operation of the control means and to also place the power-operated member in the central inoperative position.

26. In a control mechanism for a change speed transmission having two different gear ratios, a fluid motor for establishing said gear ratios, a control valve means, a manually-operated member for controlling the valve means, a shut-off valve, a second manually-operated member mechanically connected to said shut-off valve to open it by a predetermined movement, and means operable when the said second manually-operated member is moved to close said shut-off valve for subsequently causing neutralization of an operative gear ratio.

27. In a control mechanism for a change speed transmission having more than two speed ratios with two of the ratios being controlled by one shiftable member and at least another speed ratio being controlled by another shiftable member, power means for shifting said first shiftable member to cause either of the two speed ratios to be operative, control means for the power means, a manually operable lever having a neutral position, means for manually moving the other shiftable member to an operative position by a movement of the lever from its neutral position, and means for conditioning the control means for operation by a movement of the lever to a second position other than neutral so that said control means can be controlled to cause the power means to alternately shift the shiftable member of the two speed ratios, said conditioning means being so manually-controlled by the lever that said power means is inoperable by its control means whenever the lever is in neutral position.

28. In a control mechanism for a change speed transmission provided with a member shiftable to two gear ratio operative positions and a neutral position, a power cylinder including a movable element having a central position corresponding to the neutral position of the shiftable member and movable in opposite directions for shifting said member, a control valve for said power cylinder, a manual member for causing the operating of the control valve, a shut-off valve, other manually operable means movable from one position to another for opening the shut-off valve, and means operable by a movement of said other manually operable means from its shut-off valve open position for causing the shut-off valve to be closed, said shiftable member to be placed in neutral position by manual effort only and the movable element of the power cylinder to be placed in its central position by manual effort.

29. In a control mechanism for a change speed transmission provided with a member shiftable to two gear ratio operative positions and to a neutral position, means for shifting said member comprising a fluid motor having a movable element, means for connecting said movable element to the shiftable member so that the movable element of the fluid motor will be in a central position between its limits of reciprocable movement when the shiftable member is in neutral position and will cause the gear ratios to be operative when moved in opposite directions from said central position, control means for said fluid motor, manual means having a normally inoperative position, means operable by said manual means when moved from said normally inoperative position for conditioning the control means so that it can control the fluid motor, and means operable by said manual means when returned to its normally inoperative position for disabling the control means for the fluid motor, for manually restoring the movable element of the fluid motor to its central position and for manually moving the shiftable member to its neutral position.

30. In a control mechanism for a change speed transmission provided with a member shiftable to two gear ratio operative positions and a neutral position, a fluid motor having a movable element connected to the member for shifting said member from one operative position to the other through the neutral position, a source of differential pressure connected to the motor, valve means for controlling the operation of said fluid motor, means for actuating said control valve means to cause the fluid motor to shift the shiftable member from one operative position to another, a conditioning valve between the source and motor, manual means for causing operation of said conditioning valve to a position where the control valve means when operated by the actuating means will cause operation of the fluid motor or to another position where the conditioning valve cuts off the source and also frees the fluid motor of fluid forces acting on its movable element, and means operable when the manual means causes operation of the conditioning valve to said other position for neutralizing the transmission and shifting control by manual effort.

31. In a control mechanism for a change speed transmission having two different gear ratios, a fluid motor for establishing said gear ratios, a control valve means, a manually operated member for controlling the valve means, a shut-off valve, a second manually-operated member mechanically connected to said shut-off valve to open it by a predetermined movement, a speed responsive controlled valve for determining the direction of movement of the movable element of the motor and the gear ratio established and means operable when the said second manually-operated member is moved to close said shut-off valve for subsequently causing neutralization of an operative gear ratio by operator effort.

32. In a control mechanism for a change speed transmission provided with a member shiftable to two gear ratio operative positions through a neutral position, means comprising control means for shifting said member alternately to its two operative positions, a manual member independent of the control means and having a normally inoperative position, means operable by said manual member when moved from the inoperative position to another position to condition said control means to be operative, and mechanical means between the manual member and the shiftable member which is operable only when the manual member is moved back to its inoperative position for positively moving by operator effort the shiftable member to its neutral position from an operative position independently of operation of the control means and after the conditioning means is caused to be inoperative.

33. In a control mechanism for a change speed transmission provided with a member shiftable to two gear ratio operative positions and a central neutral position, power-operated means including a movable member connected to the shifting member and movable back and forth between two operative positions and through a central inoperative position corresponding to the operative positions and the central neutral position of the shiftable member, means comprising control means for causing said power-operated member to operate, a manual member independent of the control means and having a normally inoperative position, means for conditioning the control means so that when operated it will cause operation of the power-operated means, means operable by said member when moved from its inoperative position to another position for causing the conditioning means to be operative, and means operable when the manual member is moved back to its inoperative position for so controlling the conditioning means as to disable the control means and subsequently cause the moving of the shiftable member and the movable member of the power operated means from their operative positions to their central inoperative positions independently of any operation of the control means.

34. In a control mechanism for a change speed transmission provided with a member shiftable to two gear ratio operative positions and a central neutral position, power-operated means including a movable member connected to the shifting member and movable back and forth between two operative positions and through a central inoperative position corresponding to the operative positions and the central neutral position of the shiftable member, means comprising control means for causing said power-operated member to operate, speed responsive controlled means for selectively determining to which operative position the movable member of the power-operated means will assume, a manual member independent of the control means and having a normally inoperative position, means for conditioning the control means so that when operated it will cause operation of the power-operated means, means operable by said manual member when moved from its inoperative position to another position for causing the conditioning means to be operative, and means operable when the manual member is moved back to its inoperative position for so controlling the conditioning means as to disable the control means and for also causing the moving of the shiftable member and the movable member of the power-operated means from their operative positions to their central inoperative positions independently of any operation of the control means.

35. In a control mechanism for a change speed transmission provided with a shiftable member having two speed ratio operative positions and a neutral position, a power-operated mechanism connected to the shiftable member for establishing either of said two speed ratios, a source of power energy connectable to the power-operated mechanism, control means including a movable means for controlling the connecting of the power-operated mechanism to the source so as to cause the power-operated mechanism to operate when desired, conditioning means for the control means for permitting said control means when operated to cause operation of the power-operated mechanism, said conditioning means being independent of any control of the availability of power energy from the power source and when inoperative preventing the source of power energy from being connected with the power means notwithstanding the condition of the control means, operator-operated means movable from one position to another to cause the conditioning means to be in an operative position where the movable means of the control means can control operation of the power means, and other means controlled by the operator-operated means when moved back to said one position to cause a neutralization of a speed ratio after the conditioning means has disconnected the power-operated mechanism from the source and disabled said mechanism, said neutralization being accomplished by a force independent of any force from the power-operated mechanism.

36. In a control mechanism for a change speed transmission provided with a shiftable member having two speed ratio operative positions and a neutral position, a fluid motor having a movable element connected to the shiftable member for establishing either of said two speed ratios, a source of fluid pressure different from atmosphere connected to the fluid motor, means comprising control valve means for causing the fluid motor to be operated, means for determining which speed ratio the fluid motor will establish, conditioning valve means for the control means having an open operative position for permitting said control means when operated to cause operation of the motor, and an inoperative closed position disabling the motor and connecting it to atmosphere, operator-operated means movable from one position to another to cause the conditioning valve means to be moved from an inoperative position to an operative position, and other means controlled by the operator-operated means when moved back to said one position for causing after the conditioning valve means has been made inoperative a neutralization of an established speed ratio, said neutralization being accomplished by a force independent of any force from the fluid motor.

GLENN T. RANDOL.